May 22, 1951 G. E. M. PERROUX 2,553,602
PANORAMIC RECEIVER
Filed Sept. 6, 1947 3 Sheets-Sheet 1

INVENTOR.
GEORGES EDMÉ MARCEL PERROUX, DECEASED;
BY MADAME MARIE CHARLOTTE PERROUX,
     HEIR.
BY
Robert Harding Jr.
ATTORNEY Patented May 22, 1951

2,553,602

UNITED STATES PATENT OFFICE 2,553,602

PANORAMIC RECEIVER

Georges Edme Marcel Perroux, deceased, late of Paris, France, by Marie Charlotte Perroux, heiress, Paris, France, assignor to International Standard Electric Corporation, New York, N. Y., a corporation of Delaware Application September 6, 1947, Serial No. 772,580
In France September 23, 1941

Section 1, Public Law 690, August 8, 1946
Patent expires September 23, 1961

5 Claims. (Cl. 250—20)

This invention relates to radio-electrical receivers and particularly to panoramic receivers which make it possible to visually monitor all the transmissions that take place within a given band.

One of the objects of the invention is to provide receiving sets which permit efficiently to monitor all continuous wave, modulated wave or pulsed transmissions taking place within a given frequency band, or monitoring band, located on either side of a known and adjustable frequency.

Another object of the invention is to provide monitoring receivers which make it possible to listen in, within the monitoring band, to a transmission chosen at will, regardless of the visual monitoring.

Still another object of the invention is to provide means accurately to locate, in said sets the frequency of a transmission which is within the frequency band.

Among its other objects, the invention also provides in such sets, means to adjust to a given frequency and with accuracy the center of the monitoring band.

Yet another object of the invention is to provide designs, for such devices, which insure simple and rapid operation while reducing to a minimum the number of controls and manual adjustments.

In the receiver for the monitoring of transmissions taking place over a given frequency band, it is usual to cause continuous and constant variations of the tuning of an oscillatory circuit in order successively to tune the receiver to all frequencies of the monitoring band and, as a rule, this tuning variation takes place in the radio-frequency stages of the receiver, more specifically in the antenna R.-F. circuits or in the frequency converter stage (if the circuit is a superheterodyne). This design, however, has some serious drawbacks, in particular due to the fact that the amount of energy received at any time is very small, so that the receiver must be made such that its stages have considerably greater gains than is usual in radio receiving sets. In actual practice, in the case of a frequency sweep in the R.-F. stages of the receiver, it will not be possible to have sufficient high gain amplifiers to obtain complete and correct indications as to the transmissions under way, both by aural and visual observation.

Accordingly, a monitoring receiving set embodying some characteristics of the invention comprises high frequency stages so designed as to receive the whole of the monitoring band, a first frequency converter stage, a second frequency converter stage, the local oscillation of which is subjected to a sweep converting the whole of the frequency band transmitted, followed by one or more narrow band amplifier stages, and an indicator device controlled by the output signals of such stages to give aural or visual indications of the various transmissions received within the band being monitored. In order to make it possible to listen in to a given transmission within the monitoring band, another frequency converter stage is provided in parallel with the former, the frequency of this latter stage being manually controlled. In addition, audio frequency amplifier and receiver stages are connected after this third frequency converter stage.

The visual monitoring instrument preferably will be a visual indicator having little inertia, such as a cathode-ray tube. When an ordinary receiver is associated with the monitoring set, means are provided to cause some identifying characteristic of the station being picked up to appear on the screen of said cathode ray tube.

In such instruments, however, some difficulties will appear. One of such difficulties being the avoidance of the appearance on the screen of the cathode ray tube indicator, of multiple indications corresponding to the image frequencies obtained when converting one single frequency. Another difficulty is to obtain clear traces of the transmissions received as beats are generated.

These characteristics as well as others, will be discussed in detail in the following description to be read in conjunction with the appended illustrations in which.

Figure 1:
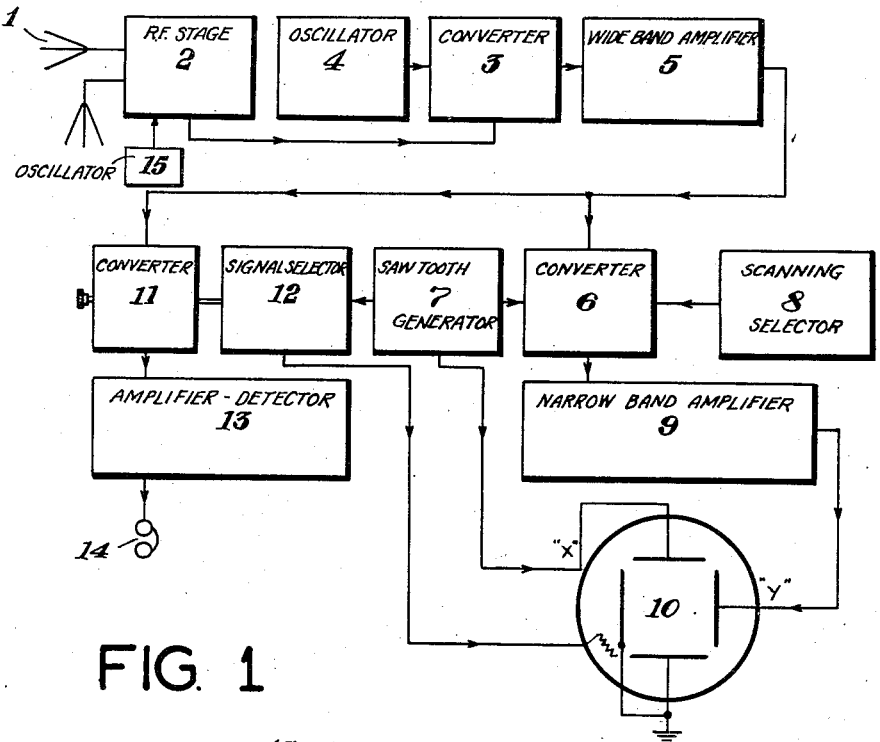
Figure 1 is a diagram in block form of a monitoring receiver in accordance with the invention.

Referring now to Figure 1 of the drawings, the invention comprises an antenna array 1 which is connected to the input of the R.-F. circuit 2 which is connected to a first frequency converter circuit 3, the local oscillation of which is supplied by a calibrated generator 4. The frequency converter 3 is followed by wide-band amplifier stages 5 which feed two networks; one comprising a second frequency converter 6 whose frequency sweep is provided by a saw-tooth wave generator 7. A scanning selector 8 also feeds converter 6 whose output is fed through a narrow band analyzing amplifier 9, to the vertical deflecting plates Y of the cathode ray indicator 10 while the X plates of indicator 10 are fed from the saw-tooth wave generator 7. The other network fed by amplifier stage 5 comprises a frequency converter 11 which is also fed by signal selector 12 whose input is supplied from the saw-tooth wave generator 7. A portion of the output of signal selector 12 is fed to the control electrode of the indicator 10. The output signals of frequency converter 11 are amplified and detected by an amplifier detector circuit 13 whose output is fed to any appropriate audio frequency reproducing device, for example, head phone 14. A calibrated oscillator 15 operating at the signal frequency supplies the R. F. circuit 2.

Figure 2:
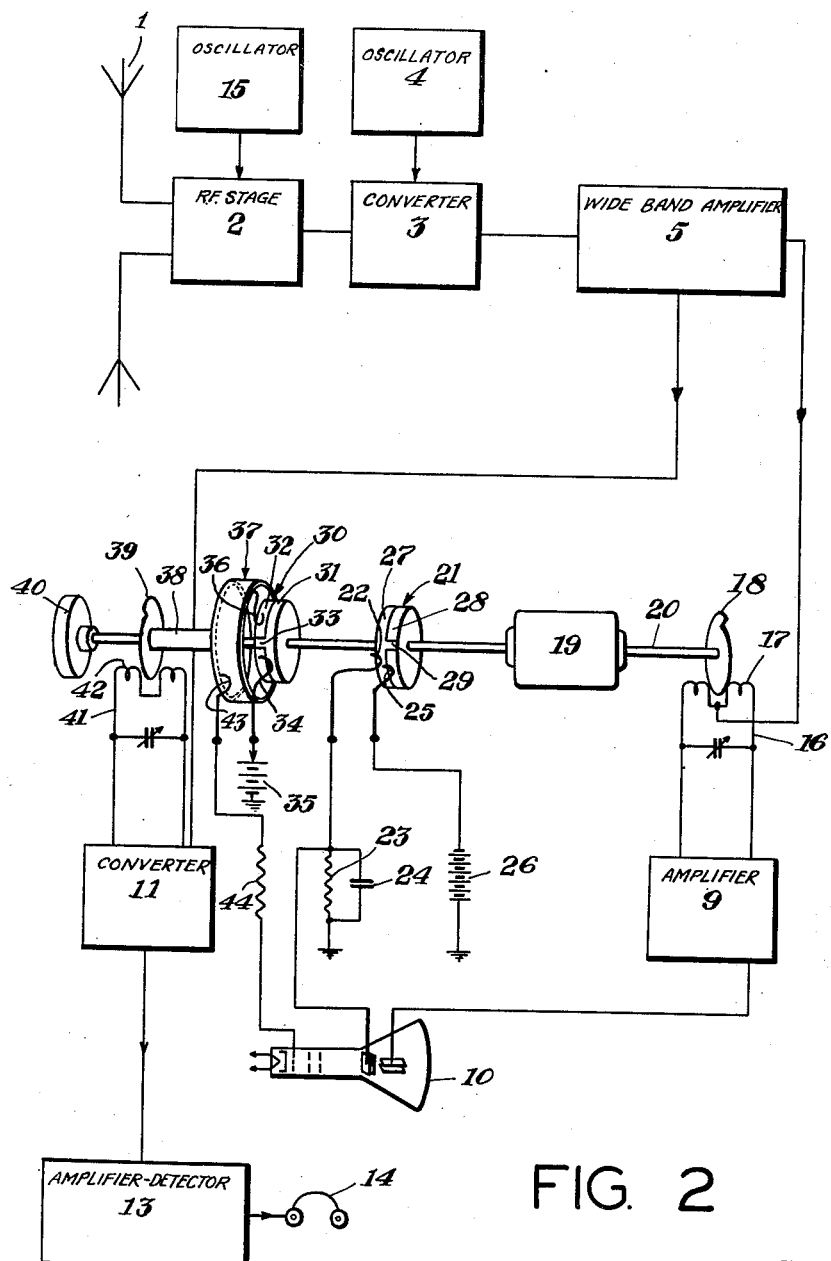
Figure 2 is a diagrammatic representation of another embodiment of a monitoring receiver using electro-mechanical means for control and sweep operations.

Referring now to Figure 2, the elements 1 to 5 are similar to those in Figure 1. But the output of amplifier 5 after the first frequency conversion is supplied to an oscillatory circuit 16 whose inductance 17, and thereby its tuning is varied continuously by means of a rotating cam 18 which is made of conductive material. The resultant mean frequency is amplified by amplifier stages 9 and fed to the Y plates of the indicator 10. Motor 19 has its shaft 20 connected to the cam 18 and cam 21. A brush 22 makes contact with the cam 21 and is connected through a grounded time-constant circuit consisting of resistor 23 and condenser 24 to the X or horizontal deflecting plates of indicator 10. Another brush 25 makes contact with cam 21 and is also connected to the positive pole of a direct current source such as a battery 26, the negative pole of which is grounded. The cam 21 is designed so that brush 22 makes contact continuously with a metallic peripheral covering 27 on one-half of cam 21 while the other half of the cam 21 comprises an insulator 28 on which brush 25 rides. Metal covering 27 on cam 21 has a narrow projection 29 which extends over a portion of the insulator 28.

The shaft 20 also rotates another cam 30 which has one-half of its outer surface covered with a conducting coating 31 and an insulated half 32 to which extends a narrow strip 33 from the conducting surface 31. Brush 34 makes contact with conducting surface 31 and is connected to the positive pole of a direct current source 35 the negative end of which is grounded. Brush 36 contacts the insulated portion 32 and is connected to a rotatable brush carrier drum 37 which is keyed to a shaft 38 connected to a cam 39 having a profile similar to that of cam 18. A knob 40 is attached to the end of shaft 38. A tank circuit 41 has an inductance 42 the value of which is determined by the cam 39, the circuit 41 forming part of the frequency converter 11, which is being fed a signal from stage 5. The output of converter 11 is rectified and amplified in circuit 13 and thus fed to a suitable audio frequency reproducing device such as head phone 14. Brush 43 makes contact with drum 37 and is connected through resistor 44 to the control grid of cathode ray tube 10.

Figure 3:
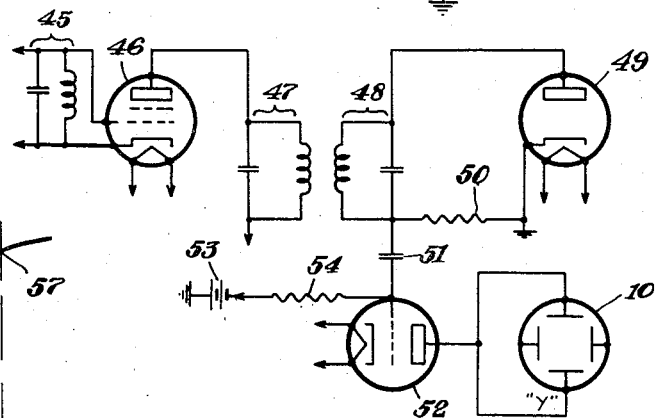
Figure 3 shows a portion of the circuit of the second frequency converter in schematic form.

Referring now to Figure 3, which discloses the circuit diagram of block 9 of Figure 1 including a tuned coupling circuit 45 is the output of which is amplified by tube 46 whose output is transmitted through sharply tuned transformer circuits 47 and 48 to the detector tube 49. The rectified signal appears across resistor 50 which is connected through condenser 51 to the grid of amplifier tube 52, is connected to the Y plates of indicator 10. Potential source 53 supplies a high bias through resistor 54 to the grid of tube 52.

Figure 4:
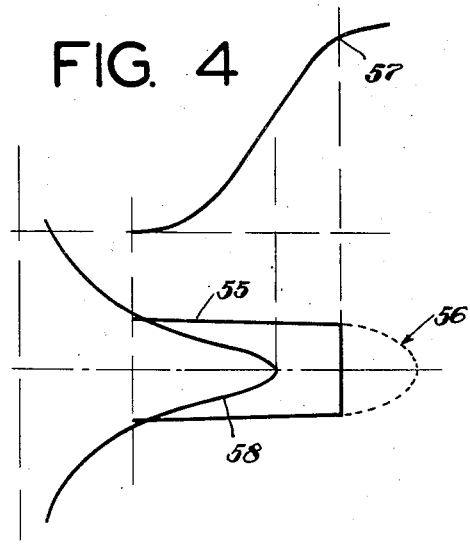
Figure 4 is a graphic representation of certain conditions of the operation of the circuit shown on Figure 3.

Figure 4 discloses the form of the pulse obtained in the plate circuit of the tube 52 which will be hereinafter explained.

Figure 5:
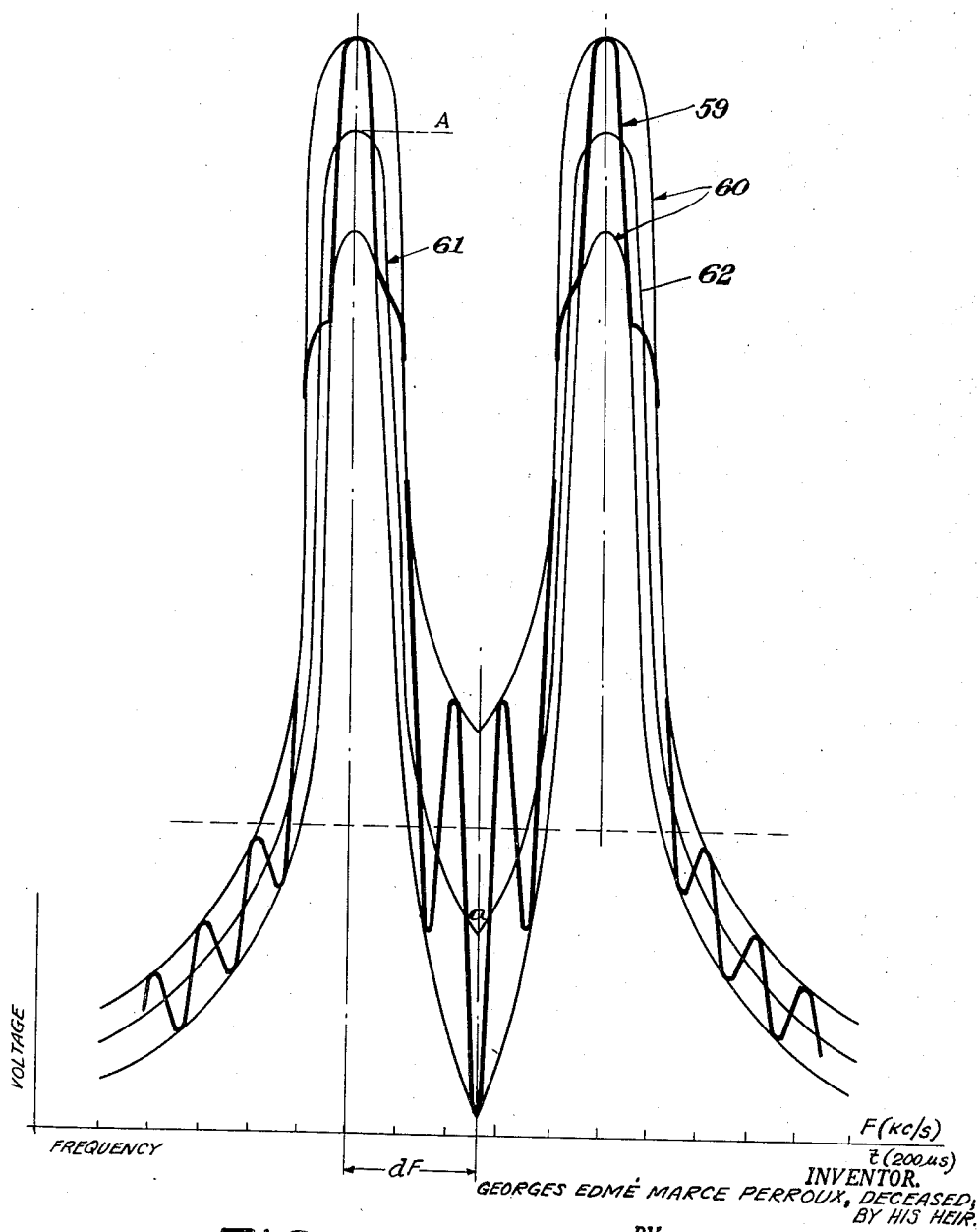
Figure 5 shows a diagram giving in graphic form some characteristics of the second frequency converter stage.

In Figure 5, the series of beats that occur in the oscillatory circuit of the analyzer or converter 6 are plotted on a graph in which the ordinates represent the voltages at the terminals of the circuit and the abscissae the frequencies.

The operation of the invention is as follows:

In the circuit of the monitoring receiver in diagram form on Figure 1, some antenna arrays such as 1 collect the signals transmitted within the frequency band under observation. Said band is limited by R.-F. input circuits 2, the tuning of these determining the position and width of the band under observation in the frequency spectrum. The signals thus received are applied to a first frequency changer or converter circuit 3, the local oscillation of which is supplied by a calibrated generator such as 4. This frequency converter is followed by one or several wide band amplifier stages 5.

The circuits of amplifier 5, which are capable of passing the wide frequency band received and converted by frequency changer 3, while amplifying it in a substantially uniform way are designed and dimensioned, in such a manner as substantially to eliminate the images generated by the first frequency conversion.

Two networks are connected to the output of amplifier 5, one serving for ordinary aural reception of a transmission chosen at random among all those picked up by antenna arrays 1, and the other for simultaneous visual monitoring of all the transmissions.

In order to ensure visual monitoring of the transmissions which take place within a given frequency band, it is then necessary to analyse or convert the frequencies of the band passed by amplifier 5. This observation generally is effected by visual means, through an indicator device of negligible inertia, such as a cathode ray oscilloscope 10.

A second frequency conversion is provided at the output of amplifier 5 for the monitoring network. It is effected by converter 6 and it is within said converter that the necessary frequency sweep takes place in order to scan the band received. This sweep is provided by a saw-tooth wave generator 7 which ensures periodical variation of the mean output frequency of converter 6. The saw-tooth wave generator 7 controls the oscillation of converter 6, for instance, by applying the saw-tooth voltage to the control electrode of an auxiliary tube connected in parallel across the oscillator, in such a way that said auxiliary tube offers a variable reactance which affects the oscillator frequency. This variation is made as linear as possible, in order to obtain uniform spread of the frequencies over the screen of indicator 10. A scanning selector 8 makes it possible to set the base frequency of frequency converter 6.

The signals which have undergone the second frequency change in converter 6 pass through a narrow band analyzing amplifier 9. Again, the circuits of amplifier 9 are so designed and dimensioned as to eliminate the image frequencies due to the frequency conversion. Moreover, these circuits comprise time constant circuits in order to permit the generation and subsequent damping of appreciable voltages during the time consumed by the sweeping device to pass from one transmission to the next within converter 6, i. e. during the time of each sweep carried out by a saw-tooth from generator 7.

Analyzing amplifier 9 excites the vertical deflecting plates of cathode ray indicator 10, the horizontal deflecting plates of which are controlled by saw-tooth wave generator 7. There appears on the screen of this indicator 10, in this manner, a horizontal sweep line, while the traces of the transmission being received appear as vertical notches.

The other parallel network of this wide band amplifier 5 is assigned to listening in to a transmission selected among the several being received. This network first comprises a frequency converter 11. The output signals of the frequency converter 11 are amplified and detected by an amplifier detector circuit 13, which passes a narrow band around the mean frequency of converter 11 and has high selectivity. This circuit also contains a low frequency filter and a static rejector device. The output signals, which correspond to the transmission manually selected by means of signal selector 12, can be heard with any appropriate audio frequency reproducing device, for instance head phones 14.

In order to provide for the indication, on the screen of tube 10, of the position occupied in the frequency band by the wave being picked up audibly, a portion of the output voltage from sawtooth generator 7 is routed toward signal selector 12. From this voltage selector 12 diverts a short periodic pulse, the phase of which is adjusted by the same selection control as frequency converter 11. This periodical pulse is applied to an appropriate electrode—for instance to the control grid of cathode ray tube 10—in order to reinforce the brightness of the cathode ray tube spot on the screen of the tube at the moment when it was showing. One thus obtains a brighter spot which moves simultaneously with the frequency selector of the ordinary audible reception network and locates the frequency of the transmission under study.

Indicator screen 10 thus shows to the observer a set of simultaneous vertical notches which correspond to the various frequencies comprised within the band received, as well as a brighter luminous index which indicates the tuning position of the ordinary receiver. It may, however, be preferable to have an accurate measure of the frequency of a transmission under way, or to tune the reception on a given frequency of said band. To this end, the invention provides, for the use of a stable calibrated oscillator 15, operating at the signal frequency. This oscillator 15 is coupled with the receiver input and thus supplies, on the screen of indicator tube 10, an additional trace, the position of which corresponds to a well defined frequency. In order to distinguish this trace from all others, it is possible periodically to cut off the output voltage of said oscillator 15 at a very low frequency (say, 5 cycles per second) so that the trace of this oscillator 15 will blink characteristically. By causing the frequency of the calibrated oscillator 15, to vary, it will be possible to bring this scintillating spot on any one of the luminous traces of the transmission, and thus to know the frequency of this transmission, while avoiding such errors as might be caused by inadequacies in the nominal linear quality of the sweep within the scanned frequency band, if one were using a fixed frequency associated with the indicator screen or carried by said screen. It is clear, however, that rather than differentiating the trace of the calibrated oscillator by means of scintillation, or blinking, it could be possible to characterize it in some other manner, e. g. brightness, shape, etc.

The completely electronically controlled and operated circuit which has just been described obviously applies, preferably, to the case where it is necessary to have rapid sweep of the frequency band under monitoring. In cases where this sweep speed, however, and accordingly the sweep speed of the oscillator, can be reduced, the use of electro-mechanical devices for the sweep circuits can offer some advantages. To this end, Figure 2 shows a modification of the system given on Figure 1, using mechanical elements.

The horizontal sweep of cathode ray indicator 10 is carried out as follows: Motor 19 which causes continuous rotation of cam 18, also drives in syinchronism a cam 21, on the surface of which is applied a brush 22, electrically connected to a grounded time constant circuit comprising resistor 23 and condenser 24. This circuit is connected to the horizontal deflecting plates of indicator tube 10. The periphery of the cam 21 also is followed by another brush 25, connected to one pole of a direct current source such as a battery 26, the other pole of which is grounded. The cam 21 is so designed that it should establish electrical connection between brushes 22 and 25 only during a very short fraction of its rotation, thus to charge the capacitor 24 which then unloads with a certain delay through its leak resistor 23 thus ensuring periodical variation of the voltage applied to sweep plates X.

The audible reception circuit is similar, on the whole, to that of Figure 1. However, selector knob 40 which adjusts the frequency of converter circuit 11 by means of a cam 39 having a profile similar, for instance, to that of cam 18, also serves to increase the brightness of one of the spots corresponding to the stations received on the screen of indicator tube 10 as follows: On the shaft 38 of control knob 40 is keyed a brush carrier drum 37 which wipes the periphery of cam 30, itself keyed to the shaft 20 of motor 19, in order to cause, at each revolution of said cam 30, the application of a short voltage pulse to an appropriate electrode, the control grid for instance, of indicator tube 10, in order to increase, in a known way, the brightness of the reception trace to which the ordinary receiver is tuned. This short pulse can be generated in one of the manners described in connection with cam 21, yet without the insertion of a time constant circuit in the connection between brush 43 and the brightness controlling electrode. Simultaneously with the adjustment of the listening receiver, by determination of the frequency of the converter oscillatory circuit 11, selector knob 40 thus causes the appearance on the screen of tube 10, of a luminous spot characteristic of the transmission being listened to, moving according to the rotation of knob 40.

Regardless of the solution resorted to—electrical or electro-mechanical, circuits 5, 10 and 13 will always have to be designed, as mentioned above in relation to Figure 1, in such a way to suppress the image frequencies generated by their respective frequency converters, in order to avoid the appearance on the screen of indicator 10, of the multiple patterns which would be due to the superimposition of a real transmission trace on a locally generated image frequency trace. In an extreme sweep position, the image frequency must be outside the frequency band passed by the above mentioned circuits, namely, the R.-F. circuits 2 and the first frequency changing circuits 3 and 5. The sweep field of indicator tube 10 must accordingly be smaller than twice the mean frequency of the converter used with the visual monitoring network. The circuits of this amplifier can, for instance, be such as shown in Fig. 3. After the usual coupling circuit 45, the signals, coming from the intermediate frequency converter which gives a frequency varying at the same rhythm as the sweep, are amplified by tube 46 and transmitted, by the coupling tank circuits 47 and 48 having tuned to the analyzing frequency, to a diode or other type detector tube 49 in which said signals are rectified. A resistor coupling 50 is established between detector 49 and audio frequency amplifier tube 52. The output of tube 52 is taken at the plate and the low frequency signals are applied in the form of voltage pulses on plates Y of cathode ray indicator tube 10.

However, such a circuit would not give satisfactory results as regards the width and shape of the monitoring pulses if some special dispositions of the circuit were not provided, in order to adapt the amplifier to the monitoring instruments contemplated by the invention. In order to narrow down the width of the signal traces, a high bias of voltage source 53 is impressed, through resistor 44 on the grid of tube 52. Moreover, use is made of the saturation of audio frequency tube 52 to flatten out the upper part of its response curve, in the manner illustrated at Figure 4. By making use of this threshold circuit, the pulses obtained in the plate circuit of tube 52 are of the form shown at 55 (Figure 4), namely essentially rectangular pulses, the rounded out crest of which is eliminated by the bend in characteristic 57 and no longer the flattened and rounded out pulses shown at 58—which is the curve applying to the oscillatory circuit 7 after amplification. This rectangular wave current is applied to vertical deflecting plates Y of indicator tube 10, the pattern of which thus is a reproduction of said rectangular pulses.

When analyzer or frequency converters 6 or 16 are subjected to the action of signals whose frequencies are substantially apart in the spectrum, these two signals, even though they be applied separately and in succession to the circuits, generate E. M. F.'s which act simultaneously. The oscillatory circuit of the analyzer then becomes the seat of a series of beats, the amplitudes of which are shown by the bold portion of curve 59, Figure 5. In this figure the ordinates are the voltages at the terminal of the circuit and the abscissae the frequencies, or on a different scale of time.

Accordingly, everything takes place as though each signal were amplitude modulated at a frequency equal to the difference between the frequencies of the incoming signals, and with a depth which varies according to the abscissae entailed. Solid line curves 60, of Figure 5 shows the envelopes of this beat phenomenon.

For cathode ray oscillograph 10 to show the incoming signals in the form of clear traces having an essentially rectangular shape, it is thus necessary to provide means for these beat phenomena not to be present in the audio frequency output voltage applied to the vertical plates of the oscillograph, in other words, to provide the system with sufficient separating power for two transmission having frequencies which differ by a small amount to appear as clearly separated traces on the screen of indicator 10. This separating power is determined by the needs of the reception and its value is the difference between the frequencies corresponding, on the screen of the oscilloscope, to the edges of the trace of a signal. If one now observes static tuning curves 61 and 62 of two consecutive signals on Figure 5, it will be seen that the operating power will be 2dF, in other words, double the frequency difference between point A, of maximum amplitude of the resonance curve 61, for instance, and the intersection point of curve 61 with resonance curve 62 of the next signal, in order of frequency.

In order to forestall the appearance of beat phenomena between two consecutive signals having a frequency difference of 2dF (power sought) the applicant provides for choosing the main frequency of frequency converter 6 or 16, i. e. the second frequency converter assigned to the visual monitoring network, in the following manner:

An appropriate form of the static resonance curve of an oscillating circuit is given by the expression:

$$A/a = \sqrt{1 + 4Q^2\left(\frac{dF^2}{F}\right)}$$

in which:

A is the maximum amplitude or resonance amplitude.
$a$ is the amplitude at the point considered.
Q is the voltage excess of the oscillatory circuit.
F is the tuning or resonance frequency.
dF is one half the separating power demanded by reception conditions.

From this expression:

$$\frac{Q}{F} = \sqrt{\frac{(A/a)^2 - 1}{2dF}}$$

The value of $A/a$ must be such that "$a$" be negligible with relation to "A", for instance, $A/a$ 100, and one thus gets the proportion $Q/F$. Since Q is given by the practical design of the oscillatory circuit, it is possible, from this expression to obtain the value of F, the mean frequency of the converter used for the visual monitoring network, which satisfies the separating power condition assigned to the network.

The mean frequency of the aural reception circuit will not be taken as equal to the mean frequency of the visual monitoring network, but preferably slightly different, for instance by some tens of kilocycles per second, in order to avoid interference between the two networks.

The various monitored transmissions may be so given, as to permit visual identification, at least for an agreed call signal. The call transmission is amplitude modulated at a certain frequency $f$.

At reception, the control grid of the cathode ray oscilloscope is subjected to an alternating voltage having a frequency which is very little different from $f$, for instance $f-1$ cycles per second. The image corresponding to the call signal will thus have an amplitude on the screen of the indicator tube, which will vary at a frequency of 1 C. P. S., thus clearly differentiating it from the other transmission traces.

The double frequency change process described can be used to good purpose, in equipment using only aural or audible monitoring.

As will be seen from the above description, the invention discloses a device which makes it possible visually to monitor all the transmissions that take place within a given band and to eliminate the appearance on the indicator cathode ray tube of multiple indications corresponding to the image frequencies obtained when converting one single frequency. In addition thereto, it will obtain clear traces of the transmission received though beats are generated and makes it possible to listen in within the monitoring band to a transmission chosen at will, regardless of the visual monitoring.

While the principles of the invention have been disclosed, it will be understood that these principles are given by way of example only and not as limiting the scope of the invention as set forth in the objects and the appended claims.

What is claimed is:

1. A panoramic receiver comprising broad band selective means for simultaneously receiving a given band of radio frequency waves, first tunable apparatus for selectively receiving any desired wave in said band, second tunable apparatus independent of the tuning of said first apparatus for simultaneously continuously scanning said band in accordance with a given scanning cycle to derive the waves contained in said band, and apparatus for separately indicating said desired wave and the waves in said band, said first apparatus comprising a source of adjustable frequency waves for mixing with said broad band waves to derive said desired wave, said second apparatus comprising a source of oscillations for mixing with said broad band waves, and means for varying the frequency of said oscillations in accordance with said given scanning cycle to derive the waves contained in said band.

2. An arrangement according to claim 1, wherein said apparatus for indicating the waves in said band comprises an oscilloscope, said oscilloscope comprising two sets of deflection elements and a screen, apparatus simultaneously applying said derived waves to one set of deflection elements of said oscilloscope, said given scanning cycle comprising a source of scanning waves, means applying said scanning waves to another set of deflection elements whereby said derived waves in said band are simultaneously displayed on separate portions of the screen of said oscilloscope.

3. An arrangement according to claim 2, in said apparatus for indicating the reception of said desired wave comprising an aural indicator.

4. An arrangement according to claim 3, further including a source of calibrated waves, apparatus applying said calibrated waves to said band selective means for calibration of the wave indications on said screen.

5. An arrangement according to claim 4, further including apparatus keying said calibration waves to cause blinking of said received calibration waves as it appears on said screen.

MARIE CHARLOTTE PERROUX.
*Heiress of the Estate of Georges Edme Marcel Perroux, Deceased.*

REFERENCES CITED

The following references are of record in the file of this patent:

UNITED STATES PATENTS

| Number | Name | Date |
|---|---|---|
| 2,279,151 | Wallace | Apr. 7, 1942 |
| 2,287,925 | White | June 30, 1942 |
| 2,381,940 | Wallace et al. | Aug. 14, 1945 |